(12) United States Patent
Sugitani et al.

(10) Patent No.: US 9,787,396 B2
(45) Date of Patent: Oct. 10, 2017

(54) OPTICAL TRANSMISSION DEVICE, TRANSMISSION SYSTEM, AND TRANSMISSION METHOD

(71) Applicant: FUJITSU LIMITED, Kawasaki-shi, Kanagawa (JP)

(72) Inventors: Kiichi Sugitani, Fukuoka (JP); Takahito Tanimura, Kawasaki (JP); Hisao Nakashima, Kawasaki (JP); Yuichi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/209,166

(22) Filed: Jul. 13, 2016

(65) Prior Publication Data
US 2017/0026114 A1 Jan. 26, 2017

(30) Foreign Application Priority Data
Jul. 21, 2015 (JP) .................................. 2015-144391

(51) Int. Cl.
*H04B 10/00* (2013.01)
*H04B 10/079* (2013.01)
*H04B 10/25* (2013.01)

(52) U.S. Cl.
CPC ....... *H04B 10/07953* (2013.01); *H04B 10/25* (2013.01)

(58) Field of Classification Search
CPC .................... H04B 10/07953; H04B 10/25
See application file for complete search history.

(56) References Cited

U.S. PATENT DOCUMENTS 6,370,188 B1 * 4/2002 Wu ..................... H04L 27/2657
 375/222
6,791,995 B1 * 9/2004 Azenkot ................ H04B 1/707
 348/E5.008

(Continued)

FOREIGN PATENT DOCUMENTS

JP 2014-217053 11/2014

OTHER PUBLICATIONS

Meng Qui et al., "Subcarrier Multiplexing Using DAC's for Fiber Nonlinearity Mitigation in Coherent Optical Communication Systems", OFC, 2014.

(Continued)

*Primary Examiner* — Danny Leung
(74) *Attorney, Agent, or Firm* — Staas & Halsey LLP

(57) ABSTRACT

There is provided an optical transmission device including: a generator configured to convert an electric signal into a plurality of parallel signals, modulate the plurality of parallel signals, shift center frequencies of spectra of the plurality of modulated parallel signals into different frequencies, so as to generate signals accommodated in a plurality of sub-channels each having different center frequencies, and generate a multiplexed signal by multiplexing the signals accommodated in the plurality of sub-channels; a transmitter configured to optical-modulate the multiplexed signal and transmit the optical-modulated signal to an optical reception device; and a controller configured to control a frequency spacing between adjacent sub-channels of the plurality of sub-channels, based on a monitoring result of reception characteristics of the signals accommodated in the plurality of sub-channels within the multiplexed signal in the optical reception device.

20 Claims, 10 Drawing Sheets

(56) References Cited

U.S. PATENT DOCUMENTS

| | | | | |
|---|---|---|---|---|
| 9,634,764 | B2* | 4/2017 | Oyama | H04B 10/07955 |
| 2011/0097075 | A1* | 4/2011 | Tanimura | H04B 10/07953 |
| | | | | 398/1 |
| 2013/0045006 | A1* | 2/2013 | Dahan | H04J 14/0257 |
| | | | | 398/34 |
| 2014/0314415 | A1* | 10/2014 | Vassilieva | H04J 14/0227 |
| | | | | 398/76 |
| 2015/0180586 | A1* | 6/2015 | Oota | H04B 10/616 |
| | | | | 398/27 |
| 2016/0149666 | A1* | 5/2016 | Tanimura | H04B 10/112 |
| | | | | 398/152 |
| 2016/0198472 | A1* | 7/2016 | Wu | H04L 5/0066 |
| | | | | 370/329 |
| 2016/0226582 | A1* | 8/2016 | Oyama | H04B 10/0775 |
| 2016/0373187 | A1* | 12/2016 | Oda | H04B 10/07953 |
| 2017/0026114 | A1* | 1/2017 | Sugitani | H04B 10/07953 |

OTHER PUBLICATIONS

Meng Qui et al., "Digital subcarrier multiplexing for fiber nonlinearity mitigation in coherent optical communication systems", Optics Express, 2014, vol. 22, Issue 15, pp. 18770-18777.

Takahito Tanimura et al., "Superimposition and Detection of Frequency Modulated Tone for Light Path Tracing Employing Digital Signal Processing and Optical Filter", OFC/NFOEC, Technical Digest, Optical Society of America, 2012.

Takahito Tanimura et al., "In-band FSK Supervisory Signaling between Adaptive Optical Tranceivers Emplying Digital Signal Processing", ECOC, Technical Digest, Optical Society of America, 2011.

* cited by examiner

… (1)

OPTICAL TRANSMISSION DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2015-144391, filed on Jul. 21, 2015, the entire contents of which are incorporated herein by reference.

FIELD

The embodiments discussed herein are related to an optical transmission device, a transmission system, and a transmission method.

BACKGROUND

With an increase of demands for large-capacity data transmission, research and developments being conducted on a digital coherent optical transmission method which enables a high-speed transmission with a single wavelength light. In addition, as a technology of enhancing a nonlinear resistance in the digital coherent optical transmission method, digital sub-channel multiplexing (DSCM), which multiplexes a plurality of sub-channels having different center frequencies by a digital signal processing to optical-modulate the sub-channels, has been studied and developed (see, e.g., Non-Patent Document 1).

According to this technology, one signal may be constituted by multiplexing a plurality of sub-channels having a lower symbol rate than the symbol rate of a wavelength division multiplexing (WDM) transmission (see, e.g., Patent Document 1) of an optical signal. As a result, a nonlinear degradation is reduced. In addition, Non-Patent Documents 2 and 3 disclose a technology relating to a channel monitoring means in a dense wavelength division multiplexing (DWDM) system.

Related technologies are disclosed in, for example, Japanese Laid-Open Patent Publication No. 2014-217053.

Related technologies are disclosed in, for example, Meng Qiu, "Digital subcarrier multiplexing for fiber nonlinearity mitigation in coherent optical communication systems," Optics Express, 2014, Vol. 22, Issue 15, p. 18770-18777 22, Issue 15, p. 18770-18777 (Non-Patent Document 1); Takahito Tanimura et al, "Superimposition and Detection of Frequency Modulated Tone for Light Path Tracing Employing Digital Signal Processing and Optical Filter," OFC/NFOFC 2012, OW4G.4 (Non-Patent Document 2); and Takahito Tanimura et al, "In-band FSK Supervisory Signaling between Adaptive Optical Transceivers Employing Digital Signal Processing," ECOC 2011, We.7.A.6 (Non-Patent Document 3).

SUMMARY

According to an aspect of the invention, an optical transmission device includes: a generator configured to convert an electric signal into a plurality of parallel signals, modulate the plurality of parallel signals, shift center frequencies of spectra of the plurality of modulated parallel signals into different frequencies, so as to generate signals accommodated in a plurality of sub-channels each having different center frequencies, and generate a multiplexed signal by multiplexing the signals accommodated in the plurality of sub-channels; a transmitter configured to optical-modulate the multiplexed signal and transmit the optical-modulated signal to an optical reception device; and a controller configured to control a frequency spacing between adjacent sub-channels of the plurality of sub-channels, based on a monitoring result of reception characteristics of the signals accommodated in the plurality of sub-channels within the multiplexed signal in the optical reception device.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

When the DSCM technology is adopted, a signal degradation caused by interference between sub-channels is reduced by providing a predetermined frequency spacing (hereinafter, referred to as a "guard band") between the sub-channels. However, as the guard band is formed wide, an entire bandwidth of the sub-channels increases. Thus, as a trade-off, the signal degradation occurs due to, for example, a filtering or a crosstalk from other WDM channels.

Hereinafter, an exemplary embodiment of a technology capable of suppressing interference between the sub-channels without causing a signal degradation will be described with reference to the accompanying drawings.

Figure 1:
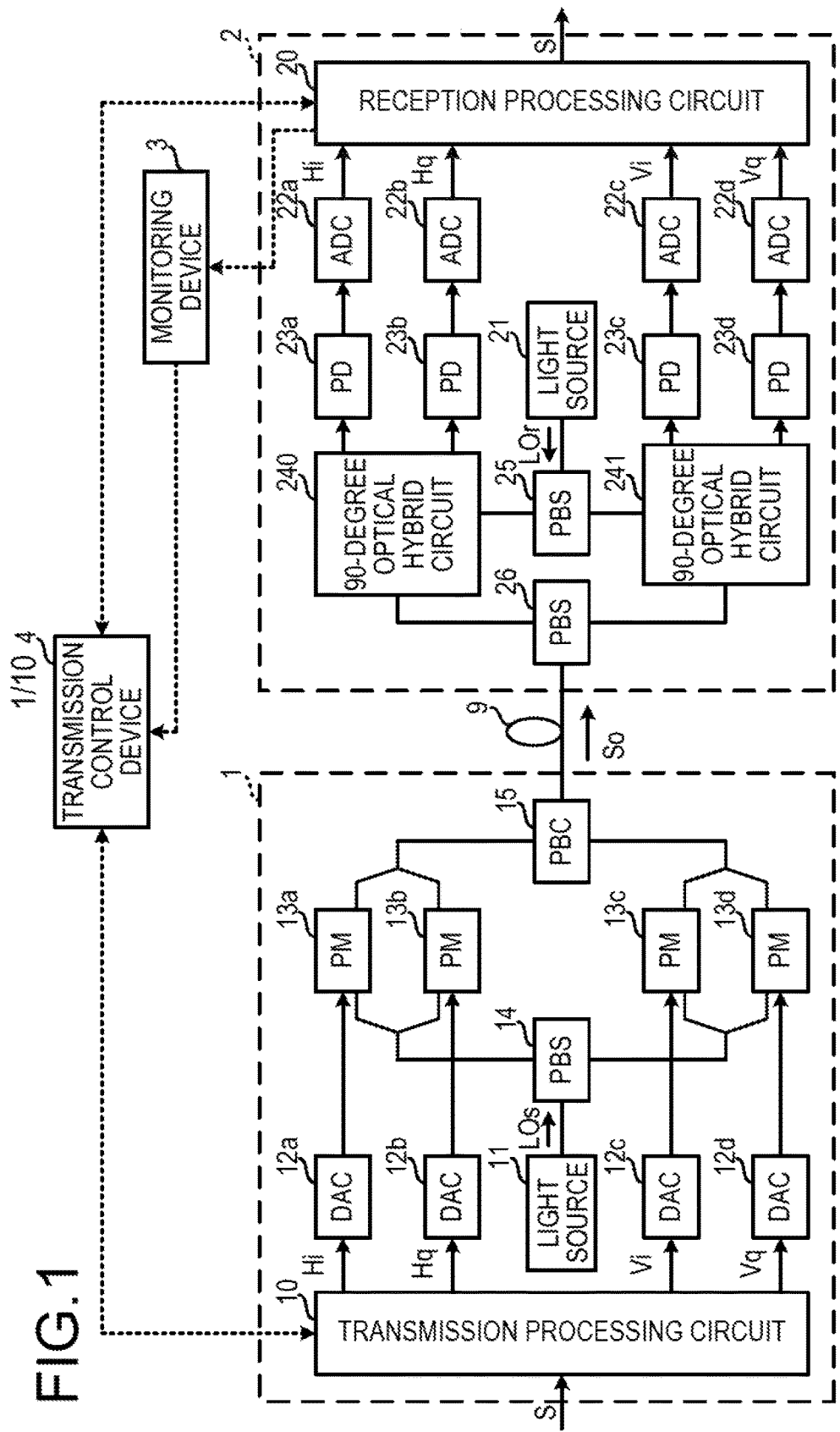
FIG. 1 is a block diagram illustrating an example of a transmission system.

FIG. 1 is a block diagram illustrating an example of a transmission system. The transmission system includes an optical transmission device 1 that transmits an optical signal So to a transmission line 9, an optical reception device 2 that receives the optical signal So through the transmission line 9, a monitoring device 3 that monitors a reception characteristic of the optical signal So in the optical reception device 2, and a transmission control device 4 that controls a transmission processing between the optical transmission device 1 and the optical reception device 2.

The transmission system performs a transmission processing based on, for example, the digital coherent optical transmission method, but is not limited thereto. As for the transmission line 9, without being limited to an optical fiber, for example, an optical waveguide formed in, for example, a free space or a semiconductor substrate may be exemplified.

The optical transmission device 1 includes a transmission processing circuit 10, a light source 11, and digital-to-analog converters (DAC) 12a to 12d. In addition, the optical transmission device 1 includes phase modulators (PM) 13a to 13d, a polarization beam splitter (PBS) 14, and a polarization beam combiner (PBC) 15.

The transmission processing circuit 10 divides an electric signal S input from another device into a plurality of sub-channels having different center frequencies and multiplexes the plurality of processed sub-channels so as to generate a multiplex signal. The transmission processing circuit 10 divides the generated multiplex signal into four digital signals Hi, Hq, Vi, and Vq and outputs the signals to the DACs 12a to 12d. Meanwhile, the transmission processing circuit 10 may be implemented by, for example, a digital signal processor (DSP). Without being limited to the DSP, the transmission processing circuit 10 may be implemented by, for example, a field programmable gate array (FPGA). Meanwhile, the configuration of the transmission processing circuit 10 will be described later.

The DACs 12a to 12d convert the digital signals Hi, Hq, Vi, and Vq, respectively, into analog signals. The analog signals are input into the PMs 13a to 13d. Meanwhile, the DACs 12a to 12d may be configured within the transmission processing circuit 10.

The light source 11 is, for example, a laser emission diode (LED) and generates a local oscillation light LOs of a predetermined frequency to output the light to the PBS 14. The PBS 14 divides the local oscillation light LOs into H-axis components and V-axis (polarization axes) components. The H-axis components of the local oscillation light LOs are input into the PMs 13a and 13b, respectively, and the V-axis components of the local oscillation light LOs are input into the PMs 13c and 13d, respectively.

The PMs 13a to 13d are exemplary transmitters and optical-modulate the analog signals from the DACs 12a to 12d. More specifically, the PMs 13a and 13b phase-modulate the H-axis components of the local oscillation light LOs based on the analog signals from the DACs 12a and 12b, and phase-modulate the V-axis components of the local oscillation light LOs based on the analog signals from the DACs 12c and 12d. The phase-modulated H-axis components and V-axis components of the local oscillation light LOs are input into the PBC 15. The PBC 15 polarization-combines the H-axis components and the V-axis components of the local oscillation light LOs with each other to output to the transmission line 9 as an optical signal So.

The optical reception device 2 includes a reception processing circuit 20, a light source 21, analog-to-digital converters (ADC) 22a to 22d, photodiodes (PD) 23a to 23d, 90-degree optical hybrid circuits 240 and 241, and PBSs 25 and 26. The PBS 26 divides the optical signal So input through the transmission line 9 into H-axis components and V-axis components to be output to the 90-degree optical hybrid circuits 240 and 241, respectively. Meanwhile, the reception processing circuit 20 may be implemented by, for example, a DSP. Without being limited to the DSP, the reception processing circuit 20 may be implemented by, for example, an FPGA.

In addition, the light source 21 generates a local oscillation light LOr in synchronization with the local oscillation light LOs of the optical transmission device 1 and inputs the local oscillation light LOr into the PBS 25. The PBS 25 divides the local oscillation light LOr into H-axis components and V-axis components to output to the 90-degree optical hybrid circuits 240 and 241, respectively.

The 90-degree optical hybrid circuit 240 includes an optical waveguide for causing the H-axis components of the optical signal So and the H-axis components of the local oscillation light LOr to interfere with each other and detects the H-axis components of the optical signal So. The 90-degree optical hybrid circuit 240 outputs the optical components, which correspond to the amplitudes and phases of each of channels I and Q, to the PDs 23a and 23b, respectively, as a detection result.

The 90-degree optical hybrid circuit 241 includes an optical waveguide for causing the V-axis components of the optical signal So and the V-axis components of the local oscillation light LOr to interfere with each other and detects the V-axis components of the optical signal So. The 90-degree optical hybrid circuit 241 outputs the optical components, which correspond to the amplitudes and phases of each of channels I and Q, to the PDs 23c and 23d, respectively, as a detection result.

The PDs 23a to 23d convert the input optical components into electric signals and output the electric signals to the ADCs 22a to 22d, respectively. The ADCs 22a to 22d convert the electric signals input from the PDs 23a to 23d into digital signals Hi, Hq, Vi, and Vq, respectively. The digital signals Hi, Hq, Vi, and Vq are input into the reception processing circuit 20.

The reception processing circuit 20 combines and multiplexes the digital signals Hi, Hq, Vi, and Vq to generate a multiplex signal and extracts a signal for each of sub-channels multiplexed with the multiplex signal. The reception processing circuit 20 generates an electric signal S from the signal of each of the sub-channels.

The monitoring device 3 acquires the signal of each of the sub-channels from the reception processing circuit 20 and monitors a reception characteristic of each of the sub-channels in the optical reception device. As the reception characteristic of the sub-channels, for example, a bit error rate or a compensation amount for a waveform distortion caused by a nonlinear optical effect may be exemplified. The monitoring device 3 transmits the monitoring result of the reception characteristic of each of the sub-channels to the transmission control device 4. Meanwhile, the monitoring device 3 may be provided within the optical reception device 2.

The transmission control device 4 transmits the monitoring result of the reception characteristics that has been received from the monitoring device 3, to the optical transmission device 1. That is, the monitoring device 3 notifies the optical transmission device 1 of the monitoring result of the reception characteristics. In addition, the transmission control device 4 instructs the optical transmission device 1 to start a transmission control.

In the optical transmission device 1, according to the instruction from the transmission control device 4, the transmission processing circuit 10 controls the frequency spacing between adjacent sub-channels based on the monitoring result of the reception characteristics of the respective sub-channels. More specifically, by providing a guard band between adjacent sub-channels, the transmission processing circuit 10 reduces a signal degradation caused by interference between the sub-channels.

Figure 2:
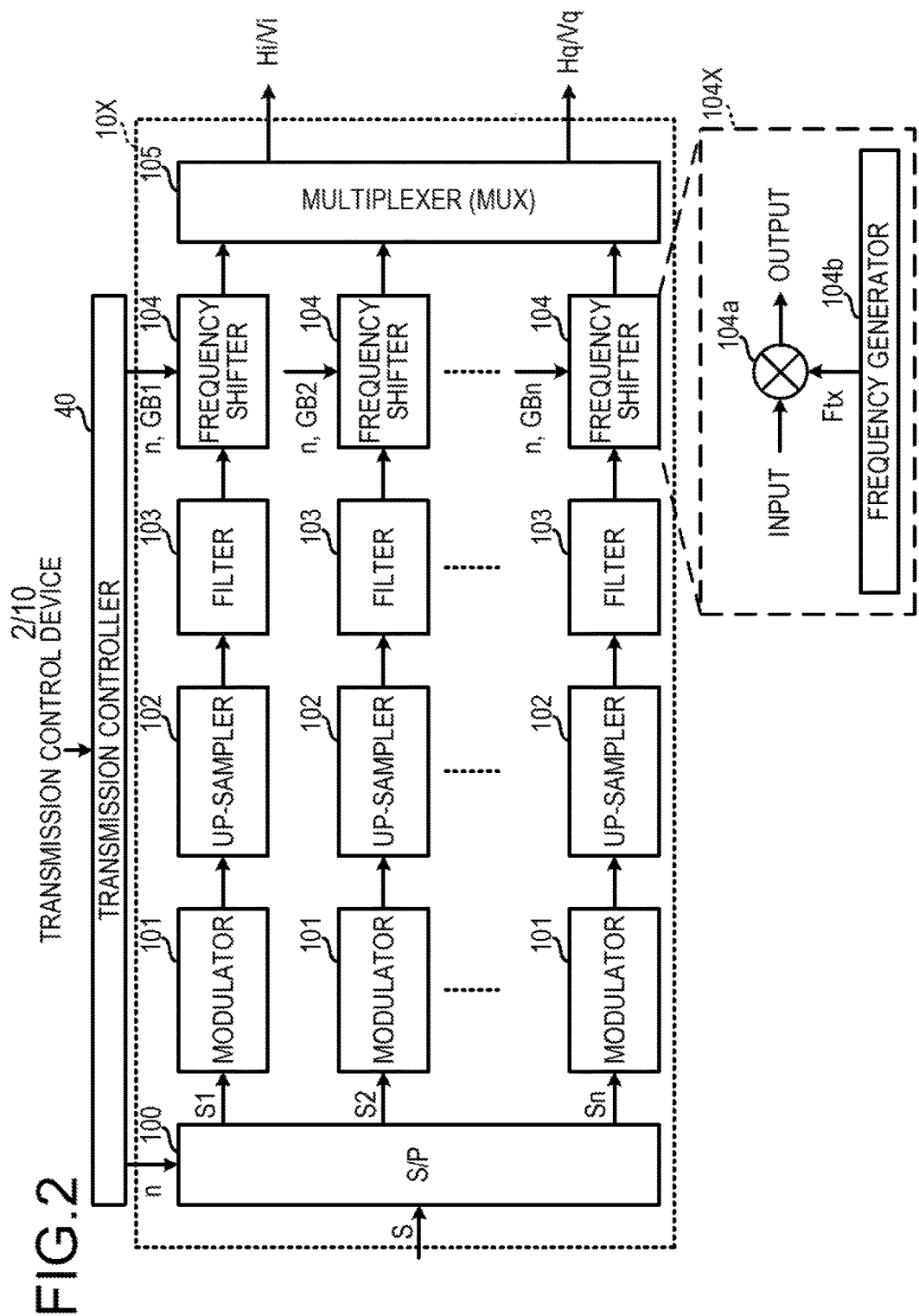
FIG. 2 is a block diagram illustrating an example of a transmission processing circuit.

FIG. 2 is a block diagram illustrating an example of a transmission processing circuit 10. The transmission processing circuit 10 includes a transmission controller 40 and a generator 10X. The generator 10X includes a serial-parallel converter (S/P) 100, a modulator 101, an up-sampler 102, a filter 103, a frequency shifter 104, and a multiplexer (MUX) 105. Each of the modulator 101, the up-sampler 102, the filter 103, and the frequency shifter 104 is provided as many as a maximum value n_max of the number n (=2, 4, 6, . . . ) of sub-channels.

The generator 10X divides the electric signal S into a plurality of sub-channels each having different center frequencies and multiplexes the plurality of processed sub-channels to generate a multiplex signal.

The S/P converter 100 converts the electric signal S from a serial signal into n parallel signals S1 to Sn by an S/P conversion. The number n (≤n_max) of the parallel signals is notified to the S/P converter 100 from the transmission controller 40. The n parallel signals S1 to Sn obtained by the S/P conversion are output to the modulators 101, respectively.

Each of the modulators 101 modulates the parallel signals S1 to Sn at a predetermined symbol rate. As for the modulating method, quaternary phase shift keying (QPSK) or quadrature phase shift keying (16 QAM) may be exemplified. However, the modulating method is not limited thereto.

Each of the up-samplers 102 performs a resampling of the modulated parallel signals S1 to Sn at an n-time symbol rate. Each of the filters 103 performs a filtering processing of the parallel signals S1 to Sn output from the up-samplers 102. As an example, the filters 103 each has a Nyquist characteristic of a root raise cosine (RRC) of a roll-off rate a and perform a Nyquist shaping of the parallel signals S1 to Sn.

Each of the frequency shifters 104 shifts the center frequencies of the spectra of the parallel signals S1 to Sn into different frequencies. More specifically, each of the frequency shifters 104 has a mixer circuit 104a and a frequency generator 104b, as indicated by a reference number 104X. The frequency generator 104b generates a frequency signal Ftx and outputs the signal to the mixer circuit 104a.

By multiplying each of the parallel signals S1 to Sn input from the filters 103 by the frequency signal Ftx, the mixer circuit 104a shifts the center frequency of the spectrum of each of the parallel signals S1 to Sn. Accordingly, the parallel signals S1 to Sn are accommodated in the n sub-channels each having different center frequencies.

$$Tx\_SHIFT(k) = \begin{cases} \left[\frac{R}{n}\left(k - \left(\frac{n+1}{2}\right)\right)\right] - GBk - \sum_{m=k+1}^{\frac{n}{2}} 2GBm \\ (k \le n/2) \\ \left[\frac{R}{n}\left(k - \left(\frac{n+1}{2}\right)\right)\right] + GBk + \sum_{m=\frac{n}{2}+2}^{k} 2GBm \\ (k > n/2) \end{cases}$$ (1)

(2)

A shift amount of the center frequency of each of the parallel signals S1 to Sn Tx_SHIFT(k) is represented by Equation 1 or 2 above. In Equation 1 or 2, R refers to a symbol rate, and GBk refers to a width of a guard band of a signal Sk (k=1 to n). Meanwhile, n refers to the number of sub-channels as described above. The number n of sub-channels and a width of a guard band GBk are notified from the transmission controller 40 to each of the frequency shifters 104. The parallel signals S1 to Sn of which the center frequencies have been shifted are input into the multiplexer 105.

The multiplexer 105 multiplexes the parallel signals S1 to Sn of the sub-channels to generate a multiplex signal. The multiplexer 105 divides the multiplex signal into digital signals Hi, Hq, Vi, and Vq and outputs the digital signals.

The transmission controller 40 is an exemplary controller and controls the number n of the sub-channels and the frequency spacing between adjacent sub-channels based on the monitoring result of the reception characteristics of the respective sub-channels in the optical reception device 2. Accordingly, the width GBk of the guard band between the sub-channels is appropriately controlled depending on the reception characteristics.

Figure 3:
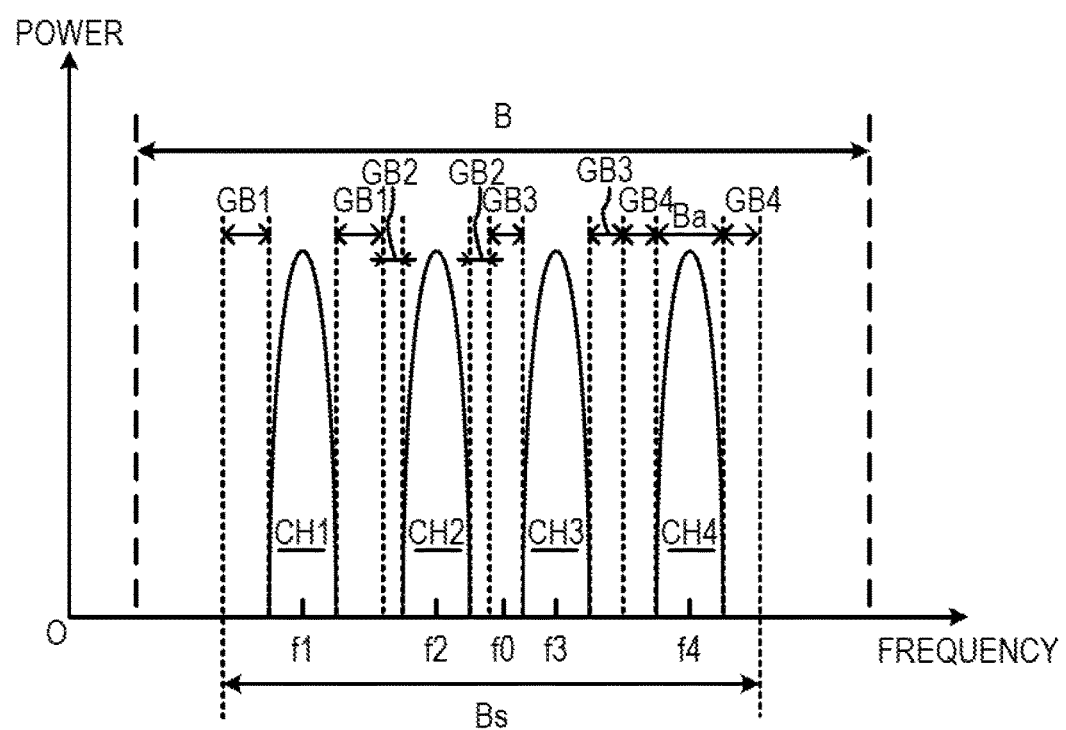
FIG. 3 is a waveform diagram illustrating an exemplary spectrum of a multiplex signal.

FIG. 3 is a waveform diagram illustrating an exemplary spectrum of a multiplex signal. In FIG. 3, the horizontal axis represents a frequency, and the vertical axis represents a power, i.e., a signal power. In the present exemplary embodiment, a multiplex signal includes, for example, four sub-channels CH1 to CH4. Meanwhile, B illustrated in FIG. 3 represents a frequency band allocated to the multiplex signal.

The center frequencies of spectra of the sub-channels CH1 to CH4 are f1 to f4, respectively. Each of the center frequencies f1 to f4 of the sub-channels CH1 to CH4 is shifted by a shift amount Tx_SHIFT(k) represented by Equation 1 or 2 above with respect to a predetermined reference frequency f0 which is a base band.

In addition, a spectrum width Ba of each of the sub-channels CH1 to CH4 is represented by Equation 3 below using the symbol rate R and the roll-off rate a.

$$Ba = (1+a) \times R \quad (3)$$

In addition, guard bands having widths GB1 to GB4 are provided at the opposite sides of each of the sub-channels CH1 to CH4, respectively. Accordingly, a frequency band occupied by each of the sub-channels CH1 to CH4 is a value obtained by adding 2×GBk (k=1~4) to the spectrum width Ba. An entire bandwidth of the sub-channels CH1 to CH4 Bs is a sum of the frequency bands of the respective sub-channels CH1 to CH4.

As described above, the transmission controller 40 controls a frequency spacing between the adjacent sub-channels CH1 to CH4 based on the monitoring result of the reception characteristics of the respective sub-channels in the optical reception device 2. Accordingly, the guard bands are formed between the sub-channels CH1 to CH4 so that the interference between the sub-channels CH1 to CH4 is suppressed.

Figure 4:
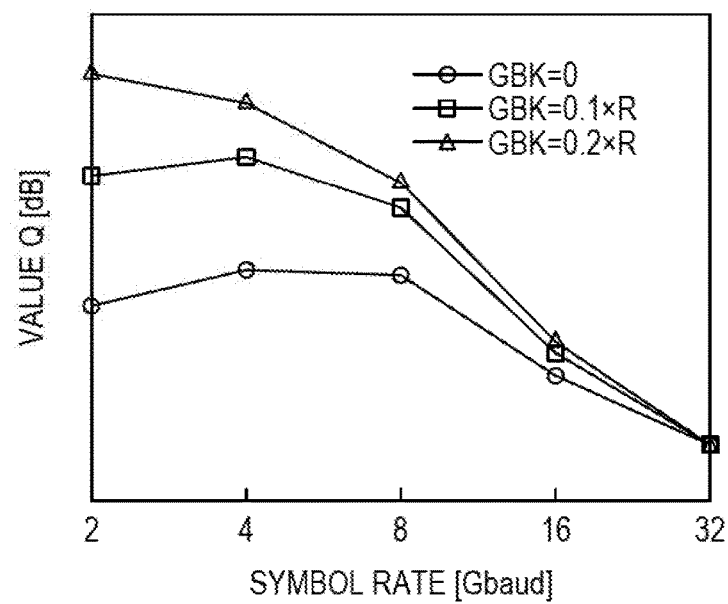
FIG. 4 is a graph illustrating an exemplary change of a value Q depending on a width of a guard band.

FIG. 4 is a graph illustrating an exemplary change of a value Q depending on the width of a guard band GBk. FIG. 4 represents a value Q with respect to a symbol rate for three cases of GBk=0, GBk=0.1×R, and GBk=0.2×R. Regardless of the symbol rate, the value Q exhibits a favorable characteristic as the width of a guard band GBk becomes wide. Thus, it may be understood that the interference between the sub-channels CH1 to CH4 is suppressed depending on the width of a guard band GBk.

Here, as the width of the guard band GBk is set to be wide, the entire bandwidth of the sub-channels CH1 to CH4 Bs increases. Hence, as a trade-off, a signal degradation occurs by, for example, a filtering or a crosstalk from other WDM channels.

However, since the widths of the guard bands GB1 to GB4 are set based on the monitoring result of the reception characteristics of the respective sub-channels CH1 to CH4, the widths of the guard bands GB1 to GB4 are appropriately controlled without causing a degradation of the electric signal S. Thus, the optical transmission device 1 is able to suppress the interference between the sub-channels CH1 to CH4 without causing a degradation of the electric signal S.

Returning back to FIG. 1, when the setting of the widths of the guard bands GBk by the transmission controller 40 is completed, the transmission processing circuit 10 notifies the transmission control device 4 of the widths of the guard bands GBk and the number of the sub-channels. The transmission control device 4 transmits a control signal, which includes the notified widths of the guard bands GBk and the notified number of the sub-channels, to the reception processing circuit 20. The reception processing circuit 20 sets therein based on the widths of the guard bands GBk and the number of the sub-channels.

Figure 5:
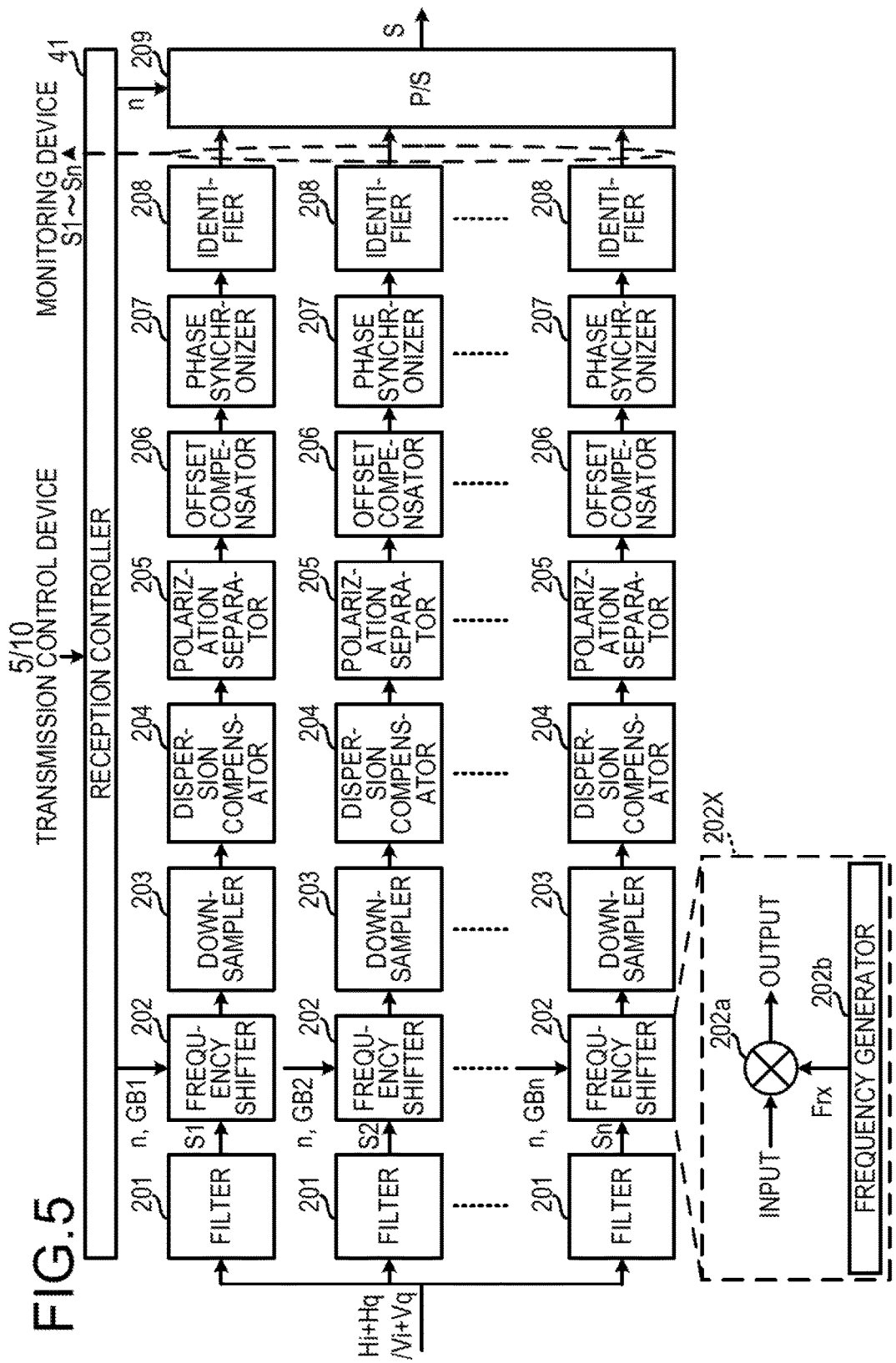
FIG. 5 is a block diagram illustrating an example of a reception processing circuit.

FIG. 5 is a block diagram illustrating an example of a reception processing circuit 20. The reception processing circuit 20 includes a filter 201, a frequency shifter 202, a down-sampler 203, a dispersion compensator 204, a polarization separator 205, an offset compensator 206, a phase synchronizer 207, an identifier 208, and a parallel-serial converter (P/S) 209. Each of the filter 201, the frequency shifter 202, the down-sampler 203, the dispersion compensator 204, the polarization separator 205, the offset compensator 206, the phase synchronizer 207, and the identifier 208 is provided as many as a maximum value n_max of the number of sub-channels.

The digital signals Hi, Hq, Vi, and Vq input from the ADCs 22a to 22d are multiplexed to a multiplex signal within the reception processing circuit 20. The multiplex signal is branched to be input into each of the filters 201. Each of the filters 201 performs a filtering processing for the multiplex signal based on the frequencies f1 to f4 for the respective sub-channels so as to extract the parallel signals S1 to Sn and outputs the signals to the frequency shifters 202.

Each of the frequency shifters 202 shifts the center frequencies of the spectra of the parallel signals S1 to Sn to the reference frequency f0 based on the number n of the sub-channels and the widths of the guard bands GBk which have been notified from a reception controller 41. Accordingly, the center frequencies of the spectra of the parallel signals S1 to Sn are shifted depending on the number n of the sub-channels and the widths of the guard bands GBk which are determined by the transmission controller 40.

More specifically, each of the frequency shifters 202 includes a mixer 202a and a frequency generator 202b as indicated by a reference numeral 202X. The frequency generator 202b generates a frequency signal Frx to output the signal to the mixer 202a.

By multiplying each of the parallel signals S1 to Sn input from the filters 201 by the frequency signal Frx, the mixer 202a shifts the center frequency of the spectrum of each of the parallel signals S1 to Sn to the reference frequency f0.

$$\text{Rx\_SHIFT}(k) = \begin{cases} \left[\frac{R}{n}\left(\left(\frac{n+1}{2}\right)-k\right)\right] + GBk + \sum_{m=k+1}^{\frac{n}{2}} 2GBm \\ (k \leq n/2) \\ \left[\frac{R}{n}\left(\left(\frac{n+1}{2}\right)-k\right)\right] - GBk - \sum_{m=\frac{n}{2}+2}^{k} 2GBm \\ (k > n/2) \end{cases} \quad (4)$$

The shift amount of the center frequency of each of the parallel signals S1 to Sn Rx_SHIFT(k) is represented by Equation 4 or 5 above. The number n of the sub-channels and the widths of the guard bands GBk in Equation 4 or 5 are notified from the reception controller 41 to each of the frequency shifters 202.

Each of the down-samplers 203 performs a down-sampling for the parallel signals S1 to Sn of which the center frequencies have been shifted, at a 1/n-time symbol rate. Each of the dispersion compensators 204 compensates for a waveform distortion caused by a wavelength dispersion occurring within the transmission line 9 for the parallel signals S1 to Sn output from the down-samplers 203. The dispersion compensators 204 compensate for the waveform distortion caused by the wavelength dispersion by, for example, adding characteristics opposite to the wavelength dispersion within the transmission line 9.

Each of the polarization separators 205 performs a polarization-separation for the parallel signals S1 to Sn output from the dispersion compensators 204. Each of the offset compensators 206 compensates for the offsets of phases of signal points for the parallel signals S1 to Sn output from the polarization separators 205 on a complex plane having a real axis I and an imaginary axis Q.

Each of the phase synchronizers 207 corrects a difference of frequencies and a difference of phases between the light source 11 of the optical transmission device 1 and the light source 21 of the optical reception device 2, so as to cause the parallel signals S1 to Sn output from the offset compensators 206 to be normally demodulated by a signal constellation (a signal space diagram) according to the modulating method. The signal constellation represents a signal point, which corresponds to an amplitude and a phase of a signal, on a complex plane. The phase synchronizers 207 output the corrected parallel signals S1 to Sn to the identifiers 208.

Each of the identifiers 208 demodulates the parallel signals S1 to Sn by identifying the signal points based on the signal constellation according to the modulating method. The demodulated parallel signals S1 to Sn are input into the P/S conversion circuit 209.

The P/S converter 209 converts the parallel signals S1 to Sn into a serial signal so as to restore the original electric signal S and output the restored signal to a circuit at the rear end thereof. The P/S converter 209 converts the parallel signals S1 to Sn into a serial signal based on the number n of the sub-channels notified from the reception controller 41. Therefore, the normal electric signal S is restored according to the number n of sub-channels determined by the transmission controller 40.

In addition, the demodulated parallel signals S1 to Sn are output to the monitoring device 3. The monitoring device 3 monitors the bit error rates of the respective parallel signals S1 to Sn as the reception characteristics in the optical reception device 2. Hence, as the parallel signals S1 to Sn, for example, test signals such as, for example, pseudo random bit streams (PRBS) may be used. The monitoring device 3 notifies the optical transmission device 1 of the monitoring result of the bit error rates of the respective parallel signals S1 to Sn.

Figure 6:
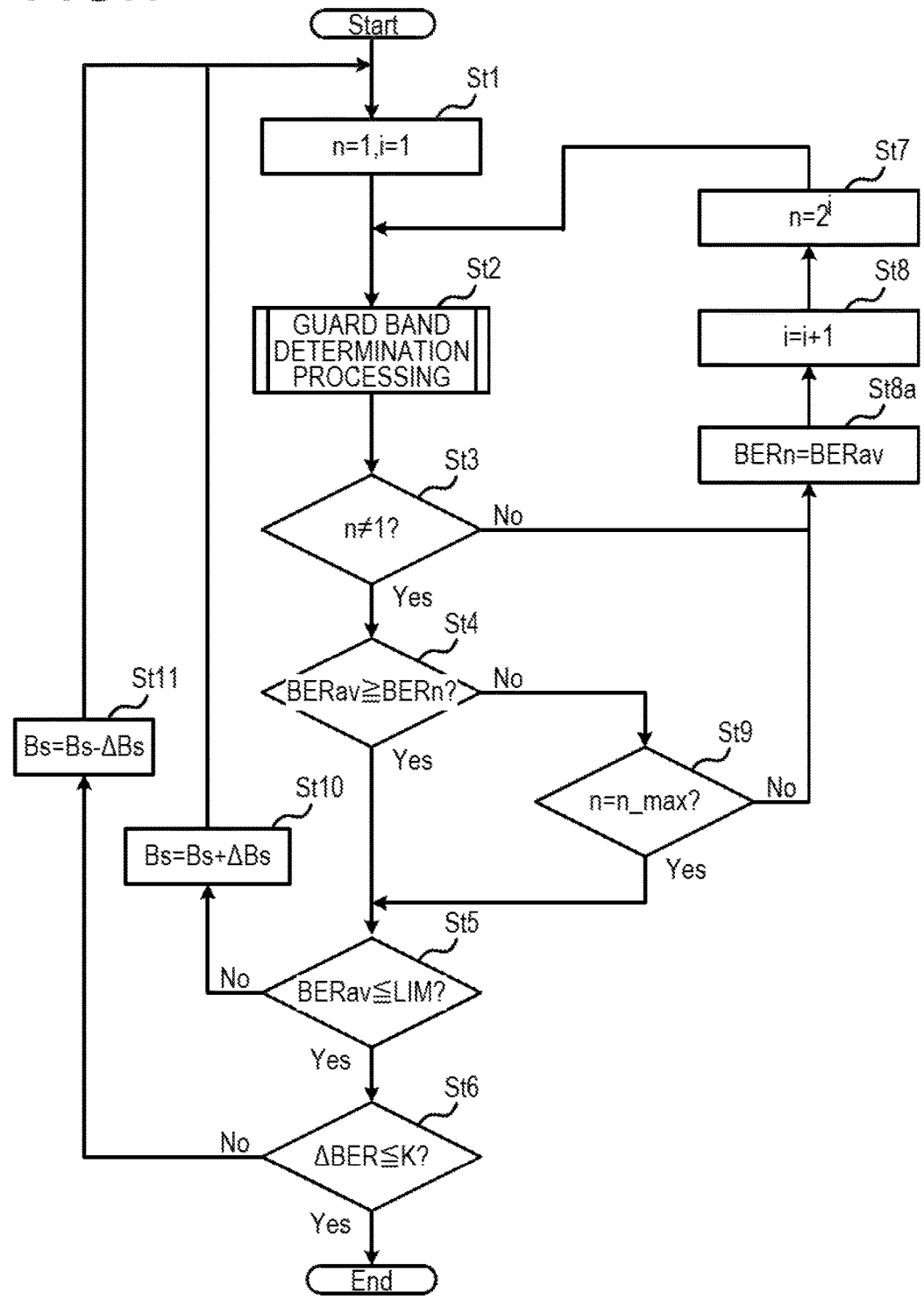
FIG. 6 is a flow chart illustrating an exemplary operation of a transmission controller.

FIG. 6 is a flow chart illustrating an exemplary operation of the transmission controller 40. The operation is performed, for example, when an instruction to start a control is received from the transmission control device 4. Meanwhile, prior to the operation, initial values for the widths of the guard bands GBk are appropriately set based on parameters such as, for example, a length, a core diameter, and a material of the transmission line 9 or parameters such as, for example, a power, a modulating method, and a symbol rate of transmitted light of the optical transmission device 1.

First, the transmission controller 40 sets the number n of the sub-channels to 1 and sets a variable i to 1 (operation St1). Subsequently, the transmission controller 40 performs a guard band determination processing in order to determine the width of a guard band GBk (operation St2). In the guard band determination processing, the transmission controller 40 controls the frequency spacing between the sub-channels based on the monitoring result of the bit error rates of the parallel signals S1 to Sn. Thus, the transmission controller 40 is able to control the width of the guard band based GBk on the bit error rates. Meanwhile, details of the guard band determination processing will be described later.

Subsequently, the transmission controller 40 determines whether the number n of sub-channels is 1 (operation St3). When it is determined that the number n of sub-channels is 1 (No of operation St3), the transmission controller 40 maintains an average value of the bit error rates BERav as an average value BERn (operation St8a). Subsequently, the transmission controller 40 adds 1 to the variable i (operation St8) and sets the number n of sub-channels to $2^i$ (operation St7). That is, the number n of sub-channels is set to 2. Subsequently, the transmission controller 40 performs the guard band determination processing again (operation St2).

When it is determined that the number n of the sub-channels is not 1 (Yes of operation St3), the transmission controller 40 compares an average value of the bit error rates of respective sub-channels BERav with the average value of the bit error rates of the n sub-channels BERn prior to a change. That is, the transmission controller 40 compares the average values of current and previous bit error rates with each other. Meanwhile, the calculation of an average value of the bit error rates is performed within the guard band determination processing (operation St2).

When it is determined that BERav≥BERn (Yes of operation St4), the transmission controller 40 performs the processing of operation St5. When it is determined that BERav<BERn (No of operation St4), the transmission controller 40 determines whether the number n of sub-channels is a maximum value n_max (operation St9).

When it is determined that the number n of sub-channels=n_max (Yes of operation St9), the transmission controller 40 performs the processing of operations St5. When it is determined that the number n of sub-channels<n_max (No of operation St9), the transmission controller 40 performs the processing of each of operations St8a, St8, and St7 so as to increase the number n of the sub-channels, and then, performs the guard band determination processing again (operation St2).

As described above, the transmission controller 40 calculates an average value of bit error rates of respective sub-channels BERav each time the number n of sub-channels is increased. When an average value of bit error rates after an increase of the number n of sub-channels BERav is higher than an average value of bit error rates prior to the increase BERav, the transmission controller 40 fixes the number n of sub-channels to the value prior to the increase. Thus, the transmission controller 40 may appropriately determine the number n of sub-channels depending on an average value of bit error rates BERav.

Subsequently, the transmission controller 40 compares the average value of the bit error rates BERav with a predetermined value LIM (operation St5). Here, the predetermined value LIM is determined depending on an intended transmission performance.

When it is determined that BERav>LIM (No of operation St5), the transmission controller 40 adds a predetermined value ΔBs to an entire bandwidth of the sub-channels Bs (operation St10) and performs the processing of operation St1 again. That is, when it is determined that the intended transmission performance is not accomplished, the transmission controller 40 expands the entire bandwidth of the sub-channels Bs and performs the guard band determination processing again (operation St2).

As described above, the transmission controller 40 controls the entire bandwidth of the sub-channels Bs based on the average value of the bit error rates of the sub-channels BERav. Thus, when the average value of the bit error rates BERav is high, the width of the guard band GBk may be expanded by expanding the entire bandwidth of the sub-channels Bs.

In addition, when it is determined that BERav≤LIM (Yes of operation St5), the transmission controller 40 compares a difference between the lowest bit error rate of the sub-channels and the predetermined value LIM ΔBER with a predetermined threshold value K (operation St6). When it is determined that ΔBER>K (No of operation St6), the transmission controller 40 subtracts a predetermined value ΔBs from the entire bandwidth of the sub-channels Bs (operation St11) and performs the processing of operation St1 again. Accordingly, when the transmission performance is excessively good, the bandwidth Bs is narrowed so that the band efficiency is improved.

When it is determined that ΔBER≤K (Yes of operation St6), the transmission controller 40 finishes the operation. The transmission controller 40 operates in this way. Subsequently, the above-described guard band determination processing (operation St2) will be described.

Figure 7:
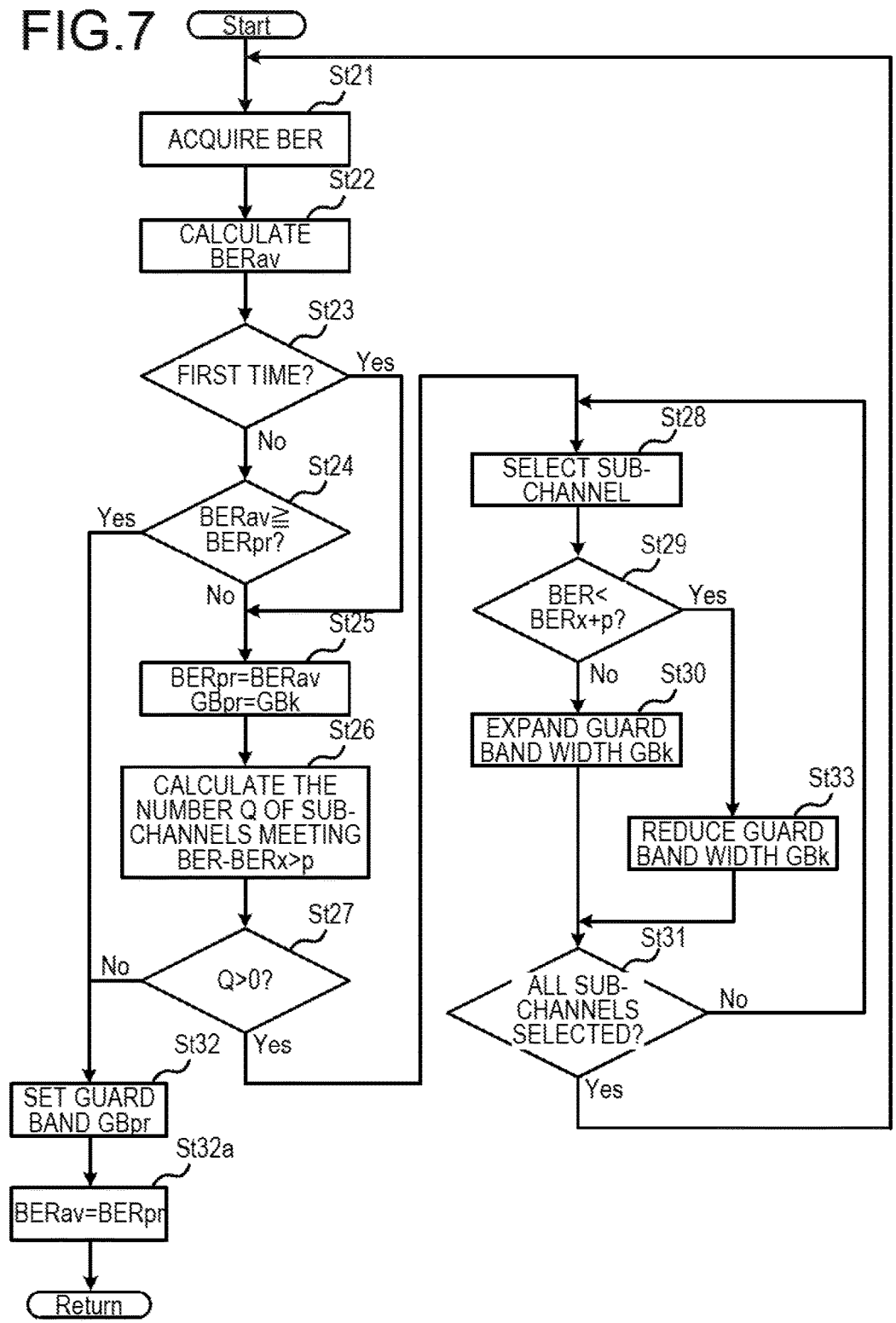
FIG. 7 is a flow chart illustrating an example of a guard band determination processing.

FIG. 7 is a flow chart illustrating an exemplary guard band determination processing. The transmission controller 40 acquires the bit error rates of each of the sub-channels BER from the monitoring device 3 (operation St21). Subsequently, the transmission controller 40 calculates an average value of the bit error rates of the sub-channels BERav (operation St22).

When it is determined that the calculation processing of the average value BERav of the bit error rates BER (operation St22) is performed for the first time after the start of the guard band determination processing (Yes of operation St23), the transmission controller 40 maintains the average value BERav as a previous average value BERav of bit error rates BER and also maintains the current width of the guard band GBk as a previous width of the guard band GBpr (operation St25). Subsequently, the transmission controller 40 calculates the number Q of the sub-channels of which bit error rates BER exhibit a difference larger than a predetermined value p from the lowest bit error rate of the sub-channels BERx (operation St26).

Subsequently, the transmission controller 40 determines whether the calculated number Q of the sub-channels is larger than zero (0) (operation St27). When it is determined that Q≤0 (No of operation St27), the transmission controller 40 sets a current width of the guard band GBpr (=GBk) (operation St32). Accordingly, when a difference of the bit error rates BER among the sub-channels is small, the transmission controller 40 may adopt an optimum width of a guard band GBk. Subsequently, the transmission controller 40 sets the average value BERav to a previous average value BERpr (operation St32a) as a preparation prior to returning to the processing of FIG. 6, and finishes the processing.

In addition, when it is determined that the calculation processing of the average value of the bit error rates BERav (operation St22) is not performed for the first time (No of operation St23), the transmission controller 40 compares the current average value BERav and the previous average value BERpr with each other (operation St24). When it is determined that BERav≥BERpr (Yes of operation St24), the transmission controller 40 sets the previous width of the guard band GBpr (operation St32). Accordingly, when the bit error rates BER increase after a control of a width of a guard band GBk in operation St28 to be described later, the width of the guard band GBpr prior to the increase may be adopted. Subsequently, the transmission controller 40 sets the average value BERav to a previous average value BERpr (operation St32a) and finishes the processing.

In addition, when it is determined that BERav<BERpr (No of operation St24), the transmission controller 40 performs the processing of operations St25 to St27 as described above. When it is determined that Q>0 (Yes of operation St27), the transmission controller 40 controls the width of the guard band b GBk y performing the processing of operations St28 to St31 and St33 which are described below.

First, the transmission controller 40 selects one of the sub-channels (operation St28) and compares the bit error rate of the sub-channel BER with a sum of the lowest bit error rate BERx of the plurality of sub-channels and a predetermined value p (BERx+p) (operation St29). Here, the predetermined value p is an allowable difference value.

When it is determined that BER≥BERx+p (No of operation St29), the transmission controller 40 expands the width of the guard band GBk (operation St30). The transmission controller 40 expands the width of the guard band GBk by, for example, multiplying a current width of the guard band GBk of the selected sub-channel by a predetermined coefficient Y (>1).

$$GBk=(Bs-Bmux-GBk\times 2QY)/2(n-Q) \quad (6)$$

In addition, when it is determined that BER<BERx+p (Yes of operation St29), the transmission controller 40 reduces the width of the guard band GBk (operation St33). The transmission controller 40 reduces the width of the guard band GBk, for example, according to Equation 6 above. In Equation 6, Bmux is a sum of spectrum widths Ba of the respective sub-channels.

As described above, the transmission controller 40 controls the frequency spacing between the sub-channels according to the result of comparison between the bit error rate of each of the sub-channels BER and the lowest bit error rate BERx. Thus, the width of the guard band GBk is set such that the bit error rate of each of the sub-channels BER is averaged.

Subsequently, when it is determined that the selection of each of the sub-channels is completed (Yes of operation St31), the transmission controller 40 performs the processing of operation St21 again. When it is determined that an unselected sub-channel exists (No of operation St31), the above-described processing is performed by selecting the other sub-channels (operation St28). The guard band determination processing is performed in this way.

In the above-described exemplary embodiment, the transmission controller 40 controls the frequency spacing between sub-channels based on the monitoring result of the bit error rates BER of the sub-channels. However, the present disclosure is not limited thereto. The transmission controller 40 may control the frequency spacing between the sub-channels based on, for example, a monitoring result of the degradation amounts of respective sub-channels caused by a nonlinear optical effect within the transmission line 9. As the nonlinear optical effect, for example, cross phase modulation (XPM), four-wave mixing (FWM), and self-phase modulation (SPM) may be exemplified. Hereinafter, an exemplary embodiment for such a case will be described.

Figure 8:
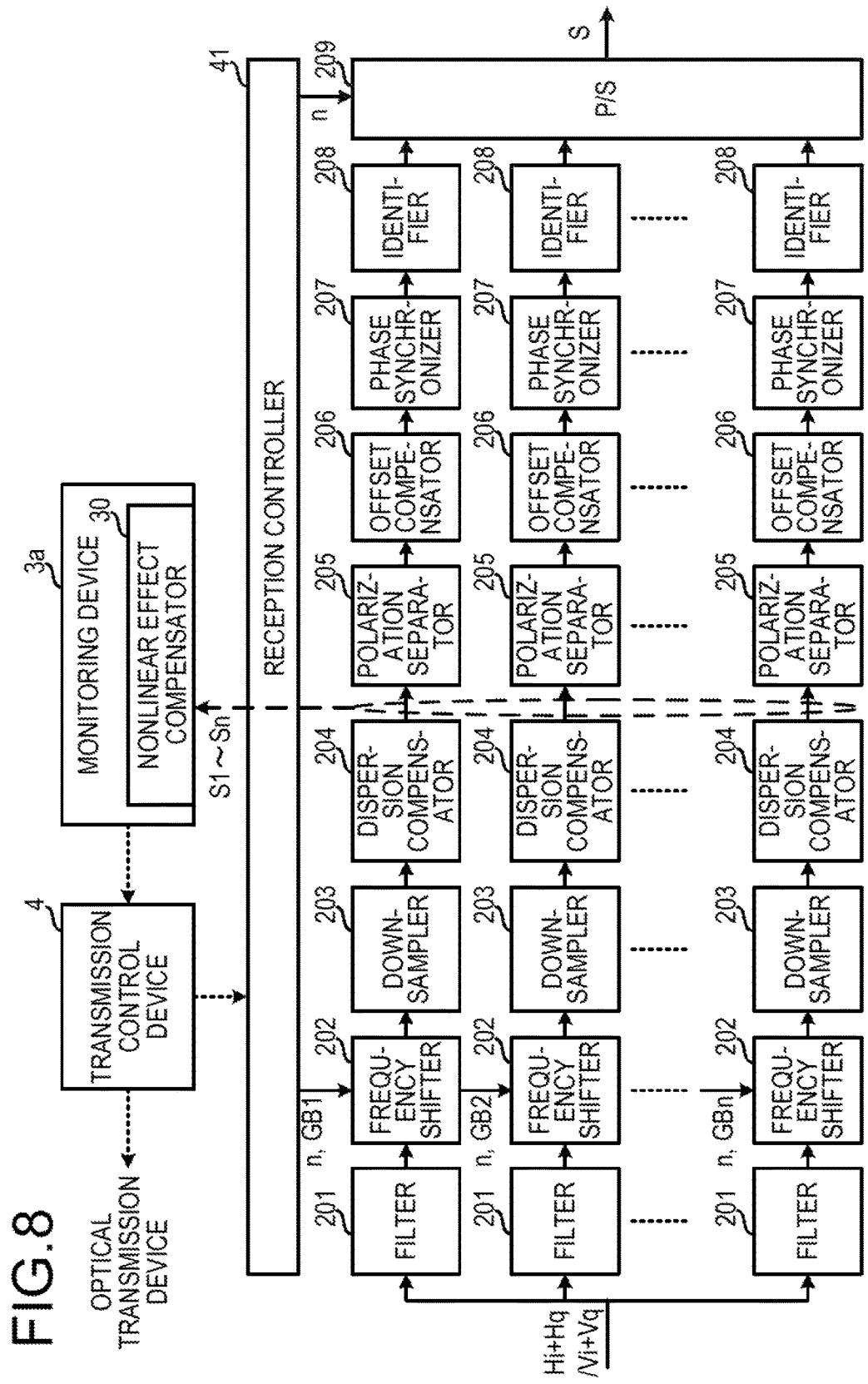
FIG. 8 is a block diagram illustrating another example of a reception processing circuit.

FIG. 8 is a block diagram illustrating another example of a reception processing circuit 20. In FIG. 8, components identical to those in FIG. 5 will be denoted by the same reference numerals as used in FIG. 5, and descriptions thereof will be omitted.

In the present exemplary embodiment, the dispersion compensator 204 outputs the parallel signals S1 to Sn, for which dispersion compensation has been completed, to a monitoring device 3a. The monitoring device 3a includes a nonlinear optical effect compensator 30 that compensates a degradation amount caused by a nonlinear optical effect.

The nonlinear optical effect compensator 30 compensates for a waveform distortion, which is an example of a degradation caused by the nonlinear optical effect, for the parallel signals S1 to Sn according to, for example, a back propagation method. The monitoring device 3a regards the compensation amounts as degradation amounts of the parallel signals S1 to Sn caused by the nonlinear optical effect and notifies the compensation amounts to the optical transmission control device 1 through the transmission control device 4.

Figure 9:
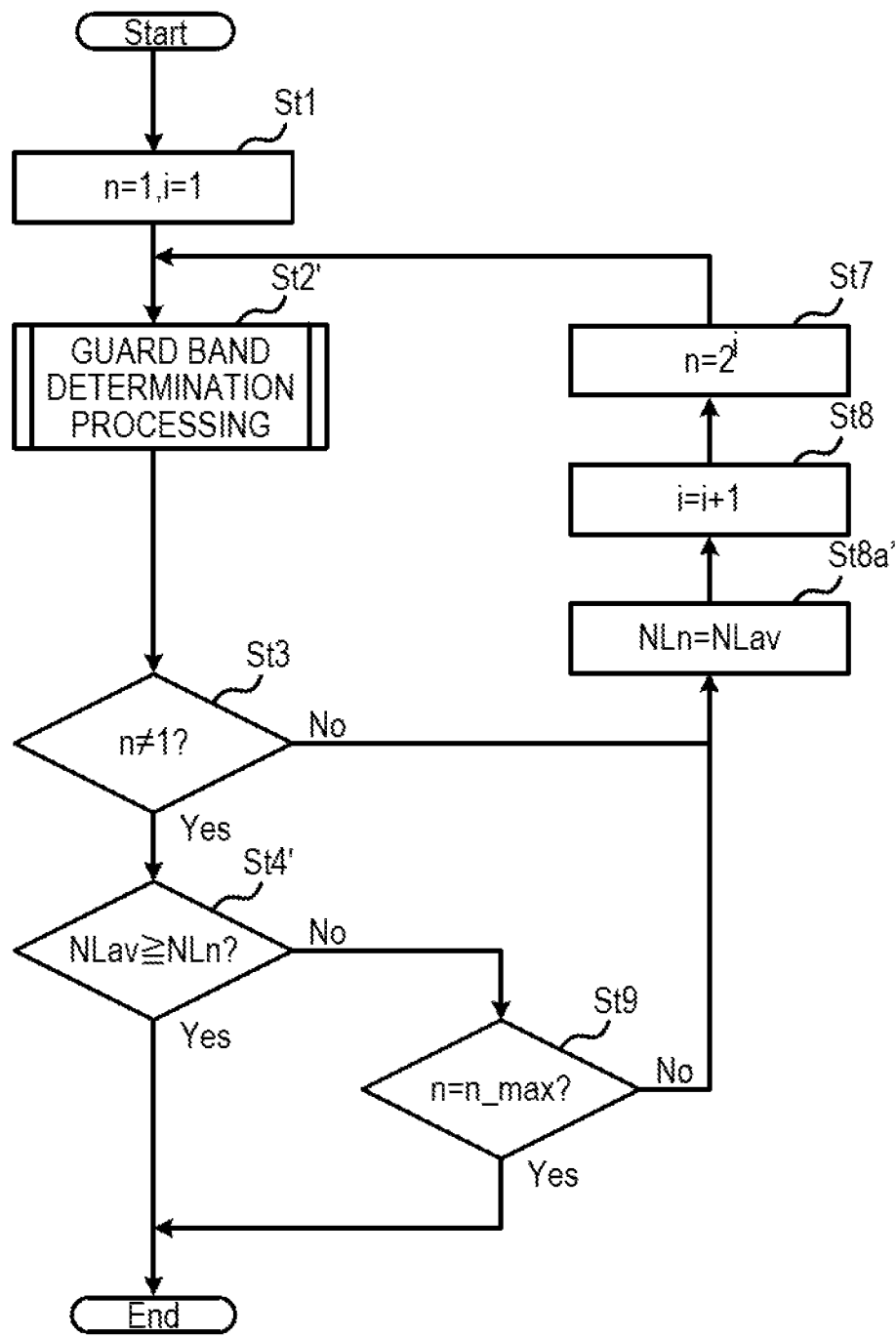
FIG. 9 is a flow chart illustrating another exemplary operation of the transmission controller.

FIG. 9 is a flow chart illustrating an operation of the transmission controller 40 in the present exemplary embodiment. In FIG. 9, processing identical to those in FIG. 6 will be denoted by the same reference numerals as used in FIG. 6, and descriptions thereof will be omitted.

The present operation is performed, for example, when an instruction to start a control is received from the transmission control device 4. Meanwhile, prior to the present operation, the initial values of the widths of the guard bands GBk are appropriately set based on parameters such as, for example, the length of the transmission line 9, the core diameter of the transmission line 9, and the material of the transmission line 9 or parameters such as, for example, a power, a modulating method, and a symbol rate of transmitted light of the optical transmission device 1.

After the initialization of the number n of the sub-channels and the variable i (operation St1), the transmission controller 40 performs a guard band determination processing in order to determine the width of the guard band GBk based on a monitoring result of the degradation amounts (operation St2'). In the guard band determination processing, the transmission controller 40 controls the frequency spacing between the sub-channels based on a monitoring result of the degradation amounts of the respective parallel signals S1 to Sn. Hence, the transmission controller 40 may control the width of a guard band GBk based on a degradation amount which is a nonlinear noise. Meanwhile, details of the guard band determination processing will be described later.

After the guard band determination processing (operation St2'), the transmission controller 40 determines whether the number n of sub-channels is 1 (operation St3). When it is determined that the number n of sub-channels is not 1 (Yes of operation St3), the transmission controller 40 compares an average value of degradation amounts of respective sub-channels NLav with an average value of degradation amounts for n sub-channels prior to a change NLn (operation St4'). That is, the transmission controller 40 compares average values of current and previous degradation amounts with each other. Meanwhile, the calculation of average values of degradation amounts is performed within the guard band determination processing (operation St2').

When it is determined that NLav<NLn (No of operation St4'), the transmission controller 40 determines whether the number n of the sub-channels is a maximum value n_max (operation St9). When it is determined that the number n of sub-channels<n_max (No of operation St9), the transmission controller 40 maintains the average value of the degradation amounts NLav as the average value of the degradation amounts for the n sub-channels prior to a change NLn (operation St8'). Subsequently, the transmission controller 40 performs the processing of each of operations St8a and St7 so as to increase the number n of the sub-channels, and then, performs the guard band determination processing again (operation St2'). Meanwhile, the transmission controller 40 performs the processing of operation St8a', St8, and St7 when it is determined that n=1 (No of operation St3) as well. In addition, when it is determined that the number n of sub-channels=n_max (Yes of operation St9), the transmission controller 40 finishes the processing.

When it is determined that NLav≥NLn (Yes of operation St4'), the transmission controller 40 finishes the operation. The transmission controller 40 operates in this way.

As described above, the transmission controller 40 calculates an average value of degradation amounts of respective sub-channels NLav each time the number n of sub-channels is increased. When an average value of degradation amounts after an increase of the number n of sub-channels NLav is higher than that prior to the increase, the transmission controller 40 fixes the number n of sub-channels to the value prior to the increase. Thus, the transmission controller 40 may appropriately determine the number n of sub-channels according to an average value of degradation amounts NLav. Subsequently, the above-described guard band determination processing (operation St2') will be described.

Figure 10:
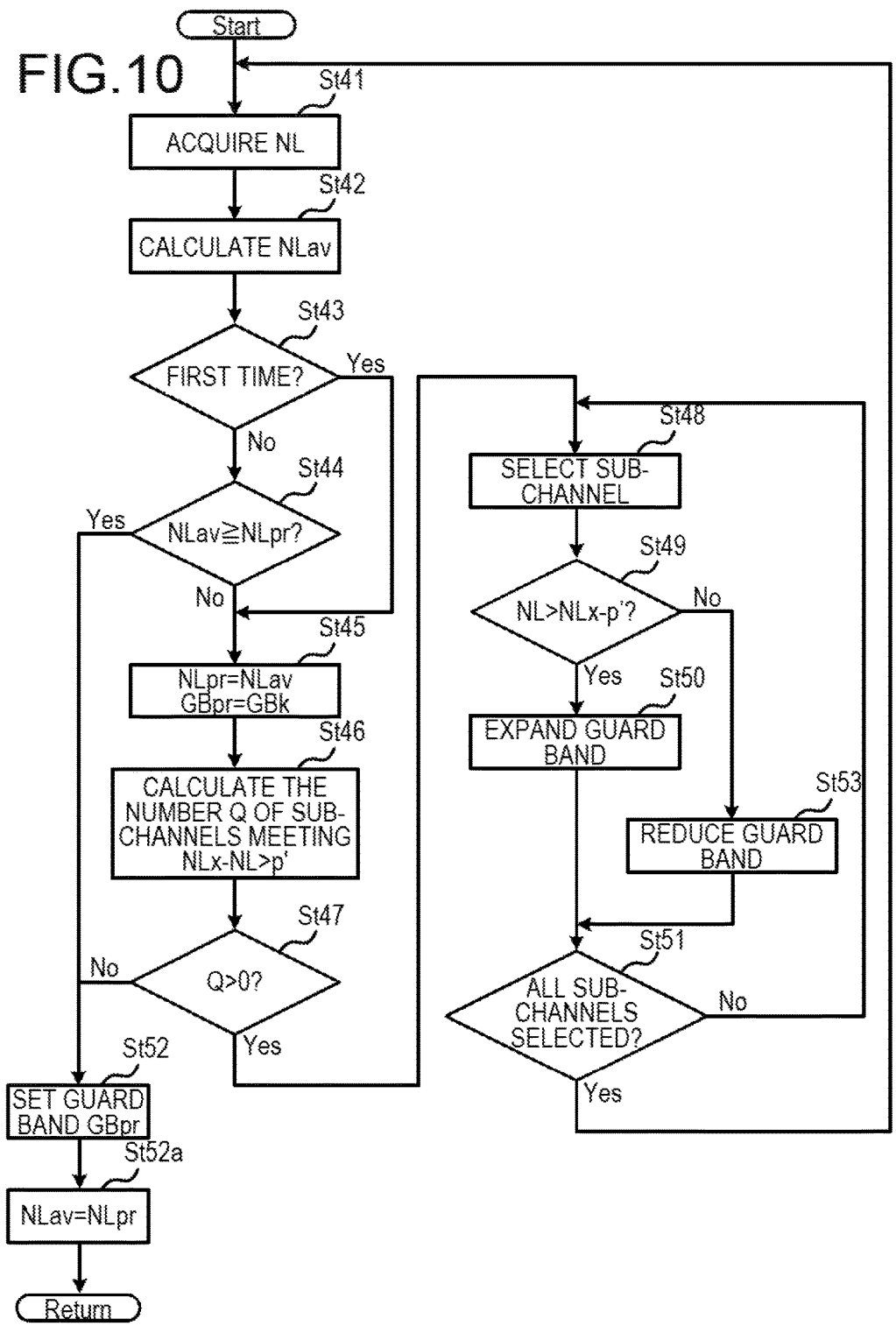
FIG. 10 is a flow chart illustrating another example of a guard band determination processing.

FIG. 10 is a flow chart illustrating the guard band determination processing in the present exemplary embodiment. The transmission controller 40 acquires degradation amounts of respective sub-channels NL from the monitoring device 3 (operation St41). Subsequently, the transmission controller 40 calculates an average value of the degradation amounts NL of the respective sub-channels NLav (operation St42).

When it is determined that the calculation processing of the average value of the degradation amounts NLav (operation St42) is performed for the first time after the start of the guard band determination processing (Yes of operation St43), the transmission controller 40 maintains the average value NLav as a previous average value NLpr of degradation amounts NL and maintains a current width of a guard band GBk as a previous width of the guard band GBpr (operation St45). Subsequently, the transmission controller 40 calculates the number Q of sub-channels of which degradation amounts NL exhibit a difference larger than a predetermined value p' from the highest degradation amount of the sub-channels (operation St46).

Subsequently, the transmission controller 40 determines whether the calculated number Q of the sub-channels is larger than zero (0) (operation St47). When it is determined that Q≤0 (No of operation St47), the transmission controller 40 sets a current width of a guard band GBpr (=GBk) (operation St52) and finishes the processing. Accordingly, when the difference of degradation amounts between the sub-channels is small, the transmission controller may adopt the current width of the guard band GBk (=GBpr). Subsequently, the transmission controller 40 sets the average value NLav to a previous average value NLpr (operation St52a) as a preparation prior to returning to the processing of FIG. 9, and finishes the processing.

In addition, when it is determined that the calculation processing of the average value of the degradation amounts NLav (operation St42) is not performed for the first time after the start of the guard band determination processing (No of operation St43), the transmission controller 40 compares the current average value NLav and the previous average value NLpr with each other (operation St44). When it is determined that NLav≥NLpr (Yes of operation St44), the transmission controller 40 sets the previous width of the guard band GBpr (operation St52). Accordingly, in a case where the degradation amounts NL increase after the control of a width of a guard band GBk in a processing following operation St48 which is described later, the transmission controller 40 may adopt the width of the guard band prior to the increase GBpr. Subsequently, the transmission controller 40 sets the average value NLav to a previous average value NLpr (operation St52a) and finishes the processing.

In addition, when it is determined that NLav<NLpr (No of operation St44), the transmission controller 40 performs the processing of operations St45 to St47 described above. When it is determined that Q>0 (Yes of operation St47), the transmission controller 40 controls the width of a guard band GBk by performing operations St48 to St51 and St53 which are described below.

First, the transmission controller 40 selects one of sub-channels (operation St48) and compares a degradation amount of the sub-channel NL with a difference between the highest degradation amount of the plurality of sub-channels NLx and a predetermined value p' (NLx−p') (operation St49). Here, the predetermined p' is an allowable difference value.

When it is determined that NL>NLx−p' (Yes of operation St49), the transmission controller 40 expands the width of the guard band GBk (operation St50). The transmission controller 40 expands the width of the guard band GBk by, for example, multiplying a current width of a guard band of the selected sub-channel GBk by a predetermined coefficient Y (>1).

When NL≤NLx−p' (No of operation St49), the transmission controller 40 reduces the width of the guard band GBk (operation St53). The transmission controller 40 reduces the width of the guard band GBk, for example, according to Equation 6 described above.

As described above, the transmission controller 40 controls the frequency spacing between the sub-channels according to a result of comparison between a degradation amount of each of sub-channels NL and the highest degradation amount of the sub-channels NLx. Thus, the width of the guard band GBk is set such that the degradation amount of each of the sub-channels NL is averaged.

Subsequently, when it is determined that the selection of each of the sub-channels is completed (Yes of operation St51), the transmission controller 40 performs the processing of operation St41 again. When it is determined that an unselected sub-channel exists (No of operation St51), the transmission controller 40 performs the above-described processing by selecting the other sub-channels (operation St48). The guard band determination processing is performed in this way.

As described above, the optical transmission device 1 according to an exemplary embodiment includes the generator 10X, the PMs 13a to 13d, and the transmission controller 40. The generator 10X divides an electric signal S into a plurality of sub-channels having different center frequencies and multiplexes the plurality of sub-channels so as to generate a multiplex signal. The PM 13a to 13d optical-modulate the multiplex signal and transmit the signal to the optical reception device 2. The transmission controller 40 controls the frequency spacing between adjacent sub-channels based on a monitoring result of reception characteristics of respective sub-channels within the multiplex signal in the optical reception device 2.

According to the above-described configuration, the transmission controller 40 controls the frequency spacing between adjacent sub-channels based on a monitoring result of reception characteristics of respective sub-channels in the optical reception device 2. Therefore, a guard band is provided between the sub-channels so that interference between the sub-channels is suppressed.

Further, since the width of each guard band GBk is set based on a monitoring result of a reception characteristic of each sub-channel in the optical reception device 2, the width GBk is appropriately controlled without causing a degradation of the electric signal S. Thus, by the optical transmission device 1 according to an exemplary embodiment, interference between the sub-channels may be suppressed without causing a degradation of the electric signal S.

In addition, the transmission system according to an exemplary embodiment includes the optical transmission device 1, the optical reception device 2 connected to the optical transmission device 1, and the monitoring devices 3 and 3a.

The optical transmission device 1 includes the generator 10X, the PMs 13a to 13d, and the transmission controller 40. The generator 10X divides an electric signal S into a plurality of sub-channels having different center frequencies and multiplexes the plurality of sub-channels so as to generate a multiplex signal. The PMs 13a to 13d optical-modulate the multiplex signal and transmit the signal to the optical reception device 2. The transmission controller 40 controls the frequency spacing between adjacent sub-channels based on a monitoring result of reception characteristics of respective sub-channels within the multiplex signal in the optical reception device 2.

The monitoring devices 3 and 3a monitor the reception characteristics of the respective sub-channels within the multiplex signal in the optical reception device 2 and notifies the optical transmission device 1 of the monitoring result.

Since the transmission system according to the exemplary embodiment includes the same configuration as that of the optical transmission device 1 as described above, the transmission system achieves the same acting effect as described above.

In addition, a transmission method according to an exemplary embodiment includes the following processes:
Process 1: Dividing an electric signal S into a plurality of sub-channels having different center frequencies
Process 2: Multiplexing the plurality of sub-channels so as to generate a multiplex signal
Process 3: Optical-modulating the multiplex signal and transmitting the signal to the optical reception device 2
Process 4: Controlling the frequency spacing between adjacent sub-channels of the plurality of sub-channels, based on a monitoring result of reception characteristics of respective sub-channels within the multiplex signal in the optical reception device 2

Since the transmission method according to an exemplary embodiment includes the same configuration as that of the optical transmission device 1 as described above, the transmission method achieves the same acting effect as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
   a generator configured to convert an electric signal into a plurality of parallel signals, modulate the plurality of parallel signals, shift center frequencies of spectra of the plurality of modulated parallel signals into different frequencies, so as to generate signals accommodated in a plurality of sub-channels each having different center frequencies, and generate a multiplexed signal by multiplexing the signals accommodated in the plurality of sub-channels;
   a transmitter configured to optical-modulate the multiplexed signal and transmit the optical-modulated signal to an optical reception device; and
   a controller configured to control a frequency spacing between adjacent sub-channels of the plurality of sub-channels, based on a monitoring result of reception characteristics of the signals accommodated in the plurality of sub-channels within the multiplexed signal in the optical reception device.

2. The optical transmission device according to claim 1, wherein the controller controls the frequency spacing based on a monitoring result of bit error rates of the signals accommodated in the plurality of sub-channels.

3. The optical transmission device according to claim 2, wherein the controller controls the frequency spacing based on a result of comparison between the bit error rates of the signals accommodated in the plurality of sub-channels and a lowest bit error rate of the signals accommodated in the plurality of sub-channels.

4. The optical transmission device according to claim 2, wherein the controller calculates an average value of the bit error rates of the signals accommodated in the plurality of sub-channels whenever a number of the plurality of sub-channels is increased, and fixes the number of the plurality of sub-channels when, after an increase of the number of the plurality of sub-channels, the average value of the bit error rates is increased as compared to the average value of the bit error rates prior to the increase.

5. The optical transmission device according to claim 2, wherein the controller controls an entire bandwidth of the plurality of sub-channels based on the average value of the bit error rates of the signals accommodated in the plurality of sub-channels.

6. The optical transmission device according to claim 1, wherein the controller controls the frequency spacing based on a monitoring result of degradation amounts of the signals accommodated in the plurality of sub-channels caused by a nonlinear optical effect within a transmission line.

7. The optical transmission device according to claim 6, wherein the controller controls the frequency spacing based on a result of comparison between the degradation amounts of the signals accommodated in the plurality of sub-channels and a highest degradation amount of the signals accommodated in the plurality of sub-channels.

8. The optical transmission device according to claim 6, wherein the controller calculates an average value of the degradation amounts of the signals accommodated in the plurality of sub-channels whenever a number of the plurality of sub-channels is increased, and fixes the number of the plurality of sub-channels when, after an increase of the number of the plurality of sub-channels, the average value of the degradation amounts is increased as compared to the average value of the degradation amounts prior to the increase.

9. A transmission system comprising:
an optical transmission device configure to include:
a generator configured to convert an electric signal into a plurality of parallel signals, modulate the plurality of parallel signals, shift center frequencies of spectra of the plurality of modulated parallel signals into different frequencies, so as to generate signals accommodated in a plurality of sub-channels each having different center frequencies, and generate a multiplexed signal by multiplexing the signals accommodated in the plurality of sub-channels;
an optical reception device coupled with the optical transmission device, and
a monitoring device,
wherein the optical transmission device further includes:
a transmitter configured to optical-modulate the multiplex signal and transmit the optical-modulated signal to the optical reception device, and
a controller configured to control a frequency spacing between adjacent sub-channels of the plurality of sub-channels, based on a monitoring result of reception characteristics of the signals accommodated in the plurality of sub-channels within the multiplexed signal in the optical reception device, and
wherein the monitoring device monitors the reception characteristics of the signals accommodated in the plurality of sub-channels within the multiplexed signal in the optical reception device and notifies the optical transmission device of a monitored result of the reception characteristics.

10. The transmission system according to claim 9, wherein the controller controls the frequency spacing based on a monitoring result of bit error rates of the signals accommodated in the plurality of sub-channels.

11. The transmission system according to claim 10, wherein the controller controls an entire bandwidth of the plurality of sub-channels based on the average value of the bit error rates of the signals accommodated in the plurality of sub-channels.

12. The transmission system according to claim 9, wherein the controller controls the frequency spacing based on a monitoring result of degradation amounts of the signals accommodated in the plurality of sub-channels caused by a nonlinear optical effect within a transmission line.

13. A transmission method comprising:
converting an electric signal into a plurality of parallel signals;
modulating the plurality of parallel signals;
shifting center frequencies of spectra of the plurality of modulated parallel signals into different frequencies, so as to generate signals accommodated in a plurality of sub-channels each having different center frequencies;
generating a multiplexed signal by multiplexing the signals accommodated in the plurality of sub-channels;
optical-modulating the multiplex signal;
transmitting the optical-modulated signal to an optical reception device; and
controlling a frequency spacing between adjacent sub-channels of the plurality of sub-channels, based on a monitoring result of reception characteristics of the signals accommodated in the plurality of sub-channels within the multiplex signal in the optical reception device.

14. The transmission method according to claim 13, wherein the frequency spacing is controlled based on a monitoring result of bit error rates of the signals accommodated in the plurality of sub-channels.

15. The transmission method according to claim 14, wherein the frequency spacing is controlled based on a result of comparison between the bit error rates of the signals accommodated in the plurality of sub-channels and a lowest bit error rate of the signals accommodated in the plurality of sub-channels.

16. The transmission method according to claim 14, wherein an average value of the bit error rate of the signals accommodated in the plurality of sub-channels is calculated whenever a number of the plurality of sub-channels is increased, and the number of the plurality of sub-channels is fixed when, after an increase of the number of the plurality of sub-channels, the average value of the bit error rates is increased as compared to the average of the bit error rate prior to the increase.

17. The transmission method according to claim 14, wherein an entire bandwidth of the plurality of sub-channels is controlled based on the average value of the bit error rates of the signals accommodated in the plurality of sub-channels.

18. The transmission method according to claim 13, wherein the frequency spacing is controlled based on a monitoring result of degradation amounts of the signals accommodated in the plurality of sub-channels caused by a nonlinear optical effect within a transmission line.

19. The transmission method according to claim 18, wherein the frequency spacing is controlled based on a result of comparison between a degradation amounts of the signals accommodated in the plurality of sub-channels and a highest degradation amount of the signals accommodated in the plurality of sub-channels.

20. The transmission method according to claim 18, wherein an average value of the degradation amounts of the signals accommodated in the plurality of sub-channels is calculated whenever a number of the plurality of sub-channels is increased, and the number of the plurality of sub-channels is fixed when, after an increase of the number of the plurality of sub-channels, the average value of the degradation amounts is increased as compared to the average value of the degradation amounts prior to the increase.

* * * * *